United States Patent [19]

Takeyama et al.

[11] Patent Number: 5,074,201
[45] Date of Patent: Dec. 24, 1991

[54] APPARATUS FOR MANUFACTURING TONYU AND TOFU

[75] Inventors: Kojiro Takeyama, Kawanishi; Yukio Hayashida, Amagasaki, both of Japan

[73] Assignee: Matsushita Electric Industrial Co., Ltd., Kadoma, Japan

[21] Appl. No.: 518,717

[22] Filed: May 4, 1990

[30] Foreign Application Priority Data

May 12, 1989 [JP] Japan .................. 1-118963
Jul. 14, 1989 [JP] Japan .................. 1-182901
Jul. 20, 1989 [JP] Japan .................. 1-187870

[51] Int. Cl.$^5$ .................. A23C 3/02; A23J 1/00; A23L 1/20
[52] U.S. Cl. .................. 99/483; 99/348; 99/353; 99/484; 99/510; 366/146; 366/314
[58] Field of Search .................. 99/325-327, 99/331-333, 348, 353, 452, 453, 456, 483, 485, 486, 489, 511-513; 366/55, 273, 274, 220, 232, 234; 241/65

[56] References Cited

U.S. PATENT DOCUMENTS

| | | | |
|---|---|---|---|
| 2,848,894 | 8/1958 | Pappas | 99/331 |
| 3,871,273 | 3/1975 | Hsieh | 99/323.3 |
| 3,908,111 | 9/1975 | DuBois et al. | 99/331 |
| 3,924,838 | 12/1975 | Waniishi et al. | 99/348 |
| 4,009,368 | 2/1977 | Faivre et al. | 99/453 |
| 4,175,482 | 11/1979 | Kumagaya | 99/516 |
| 4,802,407 | 2/1989 | Negri et al. | 99/453 |
| 4,817,516 | 4/1989 | Chikarashi | 99/483 |
| 4,869,164 | 9/1989 | Takeyama | 99/483 |
| 4,903,589 | 2/1990 | Aoyama | 99/348 |
| 4,947,742 | 8/1990 | Nishibayashi | 99/516 |

FOREIGN PATENT DOCUMENTS

| | | | |
|---|---|---|---|
| 56-25303 | 6/1981 | Japan . | |
| 3237752 | 10/1988 | Japan | 99/348 |
| 1-144944 | 6/1989 | Japan | 99/348 |
| 1-171447 | 7/1989 | Japan . | |
| 1-174351 | 7/1989 | Japan . | |
| 1-196275 | 8/1989 | Japan . | |
| 1-211465 | 8/1989 | Japan . | |
| 1-146888 | 10/1989 | Japan . | |
| 1-146889 | 10/1989 | Japan . | |
| 1-247054 | 10/1989 | Japan . | |
| 1-256361 | 10/1989 | Japan . | |
| 1-163995 | 11/1989 | Japan . | |
| 1-320964 | 12/1989 | Japan . | |
| 1-320966 | 12/1989 | Japan . | |

Primary Examiner—Timothy F. Simone
Attorney, Agent, or Firm—Cushman, Darby & Cushman

[57] ABSTRACT

An apparatus for manufacturing tonyu which has a cylindrical pan (17) having a larger diameter in relation to its depth, a cylindrical filter (44) fixed in the inner wall of the cylindrical pan (17), a hollow shaft (19 and 33) whereto the cylindrical pan (17) is fixed, a rotary cutter (16) whose axle being concentrically and rotatably supported by the hollow shaft (19), an inverted cup which is mounted on the bottom of the pan (17) to cover the rotary cutter (16) and has plural inlet openings at lower part, plural outlet openings at upper part and plural blades on its outside wall, a heater placed near said pan (17) for heating said pan, a driving motor (29), and a pair of one way clutchcoupled to said hollow shaft (19 and 33), in a manner that when the motor (29) is driven in one direction the cutter axle is driven holding the cylindrical pan (17) stopped to smash soybeans, and when the motor is driven in opposite direction the cylindrical pan (17) is rotated for dewatering the tonyu, and the motor is fixed on the housing with a resilient member (38) thereby suppresses vibration by utilizing the weight of the motor itself as a counter weight to the cylindrical pan (17).

13 Claims, 12 Drawing Sheets

APPARATUS FOR MANUFACTURING TONYU AND TOFU

BACKGROUND OF THE INVENTION

1. Field of the Invention

The present invention generally relates to an apparatus for manufacturing tonyu and tofu. In particular, it is concerned with an apparatus that can perform at least part of the entire manufacturing process automatically and consecutively needing only a single equipment.

Definition of the terms

Throughout this specification and the appended claims, the terms peculiar to the art to which this invention belongs are used in accordance with the definitions given in the following brief description of tonyu and tofu manufacturing process.

In general, tofu (beancurd) has conventionally been produced in a process comprising the following successive steps: namely, the first step of soaking soybeans in water to swell soybeans sufficiently, the second step of smashing or grinding the swollen soybean to debris to obtain raw gojiru (crude slurry of the debris suspended in water), the third step of boiling the raw gojiru to give cooked gojiru, whereby soy protein and any other water-soluble or emulsifiable components are extracted, the fourth step of separating the cooked gojiru into tonyu (soybean juice) and okara (bean cakes or beancurd refuses, insoluble or non-emulsifiable components of soybean), the fifth step of coagulating the separated tonyu by adding coagulating agent and the sixth step of molding the tonyu to give tofu while the tonyu is coagulating.

2. Description of Prior Art

The apparatus shown in FIG. 5 is an example of the known tonyu making apparata.

As shown in FIG. 5, a lower body 1 houses an electric motor 2, and an upper body 3 is mounted detachably on the lower body 1. A mixercup 5 having plural water expelling openings 4 at its upper part is placed in the upper body 3. A bearing 6, which rotatably supports an axle 7, is provided in the mixercup 5 at the center of its bottom plate. The lower end of the axle 7 is adapted to engage with a driving shaft 8 of the electric motor 2 and a mixer cutter 9 is provided on the upper end of the axle 7.

The relationship between the rotating axle 7 and the mixercup 5 is such that; a tubular body 10 extends downwardly from the bottom plate of the mixercup 5 to envelop the rotating axle 7 with an annular cylindrical space, which houses a coil spring 11 for exhibiting a resistance against the rotating movement of the rotating axle 7 only in one rotating direction. In that arrangement, the mixercup 5 will not be driven by the rotating axle 7 while it is rotating in one direction at a high number of revolution. Conversely, the mixercup 5 is driven to rotate by the axle 7 with an adequate friction of a contacting component such as coil spring 11 while the axle 7 is rotating in the reverse direction at a low number of revolution.

In addition, an outlet 12 for tonyu is provided in the lower part of the upper body 3 whose top end is covered with a lid 13 with a heater 14 for heating the contents of the mixercup 5. A timer 15 is provided for contorolling the successive steps of the process.

In the known tonyu making apparatus constructed as illustrated above, the mixer cutter 9 starts to smash the soybean at its high speed rotation when the mixercup 5 is filled with the soybean and the corresponding amount of water and covered with the lid 13, and the timer 15 is set. After smashing for a predetermined time period, the electric motor 2 stops and current is supplied to the heater 14 to boil the smashed contents.

After the end of the boiling, the supply of current to the heater stops and simultaneously the electric motor 2 starts to rotate at a lower rotational frequency in the reverse direction. In this time however, the mixercup 5 starts to be driven to rotate integrally with the axle 7 by the binding action of the coil spring 11. Then, the mixercup 5 serves as a separating container for expelling tonyu which has been produced by extracting water-soluble or emulsifiable components of soybean debris during the boiling step from the outlets 12, while retaining the separated okara (beancurd refuses) in the mixercup 5.

In the step of smashing soybean in the above process, a clearance between the mixercup 5 and the mixer cutter 9 is required to be minimized in order to ensure an effective smashing operation. On the other hand, the mixercup 5 has to be tall with respect to its diameter if it should be filled with water of the amount sufficient for the manufacture of tonyu. Such a tall shape of the mixercup 5 may frequently cause vibration at the step of centrifugal dewatering. In addition, a deep mixercup is usually hard to clean after use. The cleaning operation will become more troublesome if ribs or blades for effective collision of the soybeans with the mixer cutter and preventing revolution of the material are provided on the inner side wall of the mixercup 5. Furthermore, the ribs may exclude provision of a filter on the inner side wall of the mixercup 5 and result in very poor separation of tonyu from okara (beancurd refuses).

Moreover, when the mixer cutter 9 rotates at high rotational frequency to smash the soybeans, the mixercup 5 tends to be driven undesirably causing centrifugal dewatering during the smashing operation, thereby deteriorating the smashing performance. If the heating time at the boiling step is regulated only by the timer 15, boiling of the contents may be insufficient or excessive because the temperature of tap water may differ depending on seasons. Thus, a sensor for accurately sensing the temperature of the content should be provided to adjust the extent of boiling. However, the provision of the temperature sensor in an appropriate position is not always possible if the mixercup 5 is designed to rotate.

Furthermore, the downwardly extending structure of the heater to be immersed in the contents may also be troublesome in its handling and disadvantageous in view of sanitary conditions and even heating of the contents.

SUMMARY OF THE INVENTION

It is therefore the primary object of the present invention to provide an apparatus for manufacturing tonyu and tofu which has solved the various problems described above.

The apparatus of the present invention can operate with very little vibration during the centrifugal dewatering operation.

Further, the apparatus of the present invention permits very easy cleaning of centrifugal cage, cutter and the like components.

Still further, the apparatus of the present invention provides an excellent performance on the separation of tonyu from okara.

Still further, the apparatus of the present invention provides an excellent performance on the smashing operation of soybeans.

Still further, the present invention can permit the even boiling of gojiru in every season.

Still further, the present invention has an easy handling feature at the time of detaching the centrifugal cage therefrom without any hindrance by the heater.

Still further, the present invention can minimize uneven cooking of gojiru and its burning at the bottom of the centrifugal cage.

Still further, the present invention features the full automated manufacturing of tofu.

The object of the present invention and the attendant advantages will become apparent from the following description thereof.

According to the present invention, there is provided an apparatus for manufacturing tonyu which comprises;

a) a cylindrical pan having a larger diameter than the depth and a smooth inner face,
b) a hollow shaft having a flange for supporting said pan,
c) a rotary cutter whose axle being concentric with and rotatably supported by said hollow shaft and having a cutting tip for smashing raw soybeans,
d) an inverted cup which is mounted on the bottom of said pan to cover said cutting tip part of said rotary cutter and has a side wall with a plurality of inlet and outlet openings and a plurality of blades on its outer face,
e) a heater placed near to said pan for heating said pan,
f) a driving motor capable of driving two coupling means, one being detachably engageable with said hollow shaft and the other with the cutter axle for rotating said hollow shaft and cutter axle, respectively,
g) a cylindrical filter detachably fit in the inner wall of said pan and having a multiplicity of small pores, and
h) a container placed along the outer periphery of said pan for receiving centrifugally-squeezed tonyu.

In a first preferred mode of the invention, said cylindrical pan and motor are supported by the housing at two points dimetrically opposite with respect to said cutter axle and hollow shaft in a horizontal plane at a level of the approximate center of gravity of a combined body of the pan and motor.

In a second preferred mode of the present invention, the cylindrical pan may be detachably fastened on the flange of the hollow shaft with the inverted cup through a packing.

In a third preferred mode of the present invention, the surface of said cylindrical filter, which is detachably fit in the inner wall of said pan and has a multiplicity of small pores, may be coated with polytetrafluoroethylene.

In a fourth preferred mode of the present invention, said driving motor may have a motor axle and a motor hollow shaft mounted rotatably on said motor axle. Said cutter axle and hollow shaft may be designed to mesh with said motor axle and motor hollow shaft by said two coupling means, respectively, and detachable with vertical displacement of one, wherein said motor hollow shaft is mounted on the motor axle through a bearing and a one way roller clutch which exhibits a resistance to one rotational direction. The motor hollow shaft also has at its lower end a spring clutch which exhibits a resistance on the shaft in a rotational direction reverse to that of the one way roller clutch.

In a fifth preferred mode of the present invention, said apparatus may further comprise a lid which covers said cylindrical pan with a vapor vent and a temperature sensor placed adjacent to the vapor vent.

In a sixth preferred mode of the invention, the apparatus may further comprises an annular tonyu trough concentric with and encircling the periphery of said cylindrical pan and having an outlet at a slightly lower level than that of the top end of said pan and said heater may be placed adjacent to the periphery of the bottom plate of said pan.

In a seventh preferred mode of the invention, the apparatus may further comprise a contorolling apparatus adjusted to rotate said cutter intermittently while said heater is energized.

In another aspect of the present invention, the apparatus may further comprise a molding tray for tofu and a coagulating agent supplying unit in order to serve it as an apparatus for manufacturing tofu.

In the following paragraphs, these will be described in more detail with reference to the construction of the apparatus and its operation.

In an apparatus built in accordance with the main feature of the invention, the operation is started by filling the cylindrical pan with the soybeans and the corresponding amount of water and by rotating the cutter at a high number of revolutions. The soybeans are sucked into a space defined by the inverted cup through the lower openings in the side wall of the inverted cup and smashed by the rotary cutter into debris which are then expelled from the upper opneings of the side wall mixed with water, to permit a circulation of the admixture of the soybeans, the debris and water between the inside and outside of the cup space. This circulation is induced by the upward motion of the admixture due to revolving of the rotary cutter. The circulation is maintained making so-called pumping action to make the debris finer.

During the smashing operation, revolution of water in the pan is effectively prevented by the blades provided on the side wall of the cup and the pumping action can be enhanced because the admixture is sucked to centralize, i.e., to the direction of the rotary cutter. The efficient pumping action permits provision of the cylindrical pan of larger diameter as compared with that of the rotary cutter and of smaller height. This means generation of lesser vibration at the time of centrifugal dewatering by reverse rotation of the pan.

In the apparatus built in accordance with the preferred mode of the present invention, the motor in the combined body with the pan will serve as a counterbalance for the body to suppress a possible inbalance of weights on the pan and to effectively suppress the vibrating system to substantially stable state even if a vibration is actually generated.

In the apparatus built in accordance with the preferred mode of the present invention, the cleaning by disassembling it into respective components will be made easy.

When the apparatus is built in accordance with the preferred mode of the present invention, a provision of ribs or blades on the inner wall of the pan mentioned in the description of the prior art becomes unnecessary. This is because there is the pumping action or circulation of mixture of water, smashed soybean and row soybeans induced by the revolving rotatary cutter, which pushes the liquid upwards, besides smashing the soybeans. The arrangement of the openings for expelling at upper part and the openings for introducing at the lower part together with cutter blades with pitch makes the pumping action, and the provision of the outside ribs or blades on the outer face of the inverted cup enhance the pumping action. This feature also permits an easy fitting of a cylindrical filter having a multiplicity of small pores in the pan to greatly improve the separating performance of tonyu from okara as compared with the conventional apparatus. Moreover, since the surface of the cylindrical filter is coated with polytetrafluoroethylene film, protein and other soluble or emulsifiable components extracted from the soybean debris during the boiling step do not stick to the pores of the filter, thus ensuring an efficient centrifugal dewatering and separation of tonyu from okara.

In the apparatus built in accordance with said fourth preferred mode of the present invention, the spring clutch fixed on lower end of the motor hollow shaft acts to impede the driven rotation of the cylindrical pan by the motor axle rotating at high frequency during the smashing. This action ensures an efficient smashing of the soybeans without lowering the relative velocity of the cutter tip with respect to the pan. Furthermore, the provision of the one way roller clutch permits the rotation of the pan during the centrifugal dewatering of gojiru in the pan.

When the apparatus is built in accordance with said fifth preferred mode of the present invention, a reliable detection of the boiling point becomes possible by the vapor which suddenly is generated from the gojiru in the cylindrical pan at the time of boiling during the heating step. It ensures an adequate extent of cooking gojiru to give good tonyu.

When the apparatus is built in accordance with said sixth preferred mode of the present invention, a provision of the heater adjacent to the bottom plate of the pan and thus an easy detaching of the pan becomes possible for maintaining the apparatus in good sanitary conditions.

When the apparatus is built in accordance with said seventh preferred mode of the present invention, an even heating of gojiru becomes possible to minimize its burning on the bottom of the pan during the heating operation.

In a case wherein the apparatus further includes a molding tray for tofu and a coagulating agent supplying unit, the apparatus can also be used as an apparatus for manufacturing tofu.

BRIEF DESCRIPTION OF THE DRAWINGS

In the following paragraphs, the present invention will be described in more detail by referring to the embodiments illustrated in the accompanying drawings in which.

DESCRIPTION OF THE PREFERRED EMBODIMENTS

Figure 1:
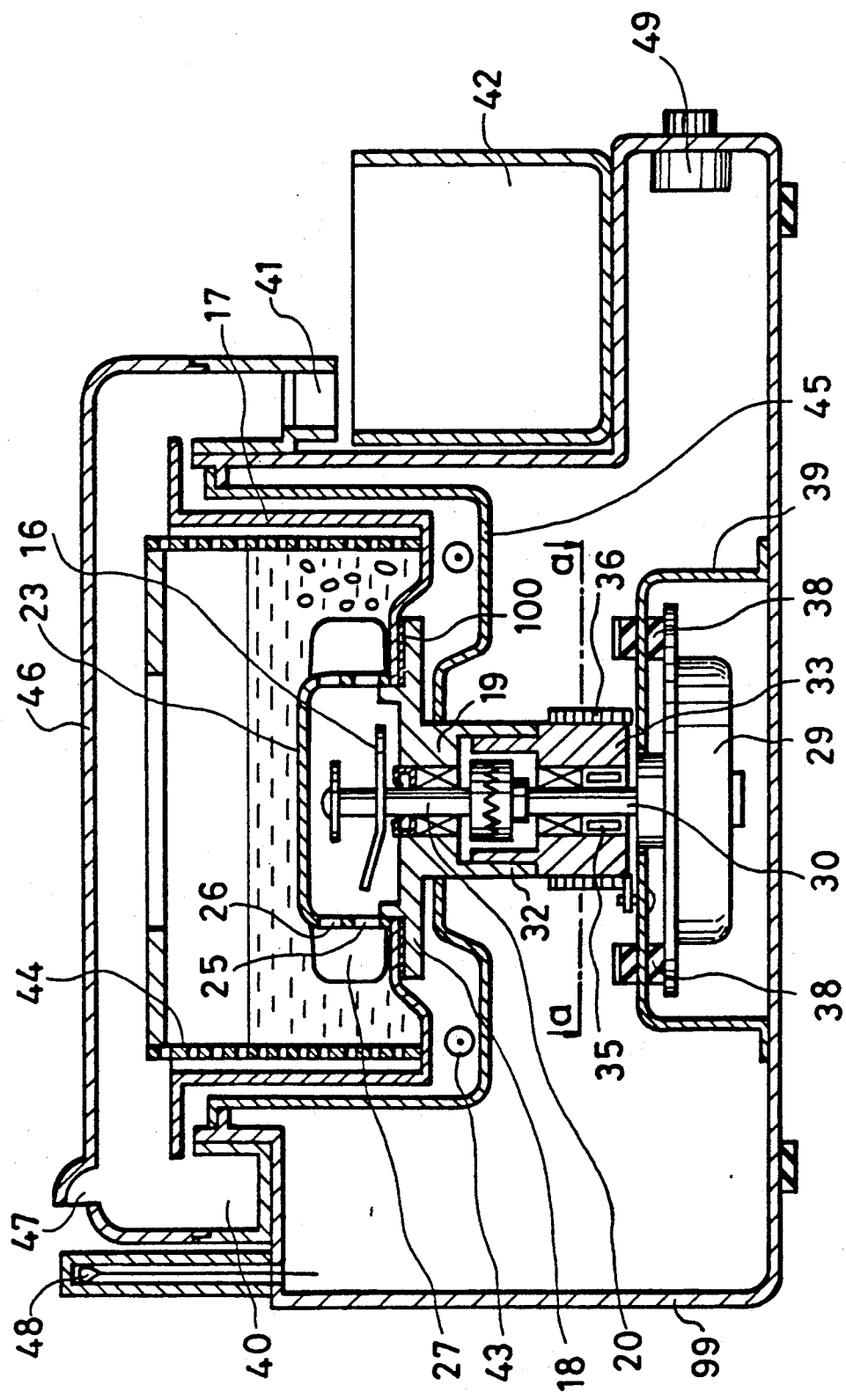
FIG. 1 is a side sectional view showing an embodiment of the apparatus for manufacturing tonyu built in accordance with the present invention.
Figure 3:
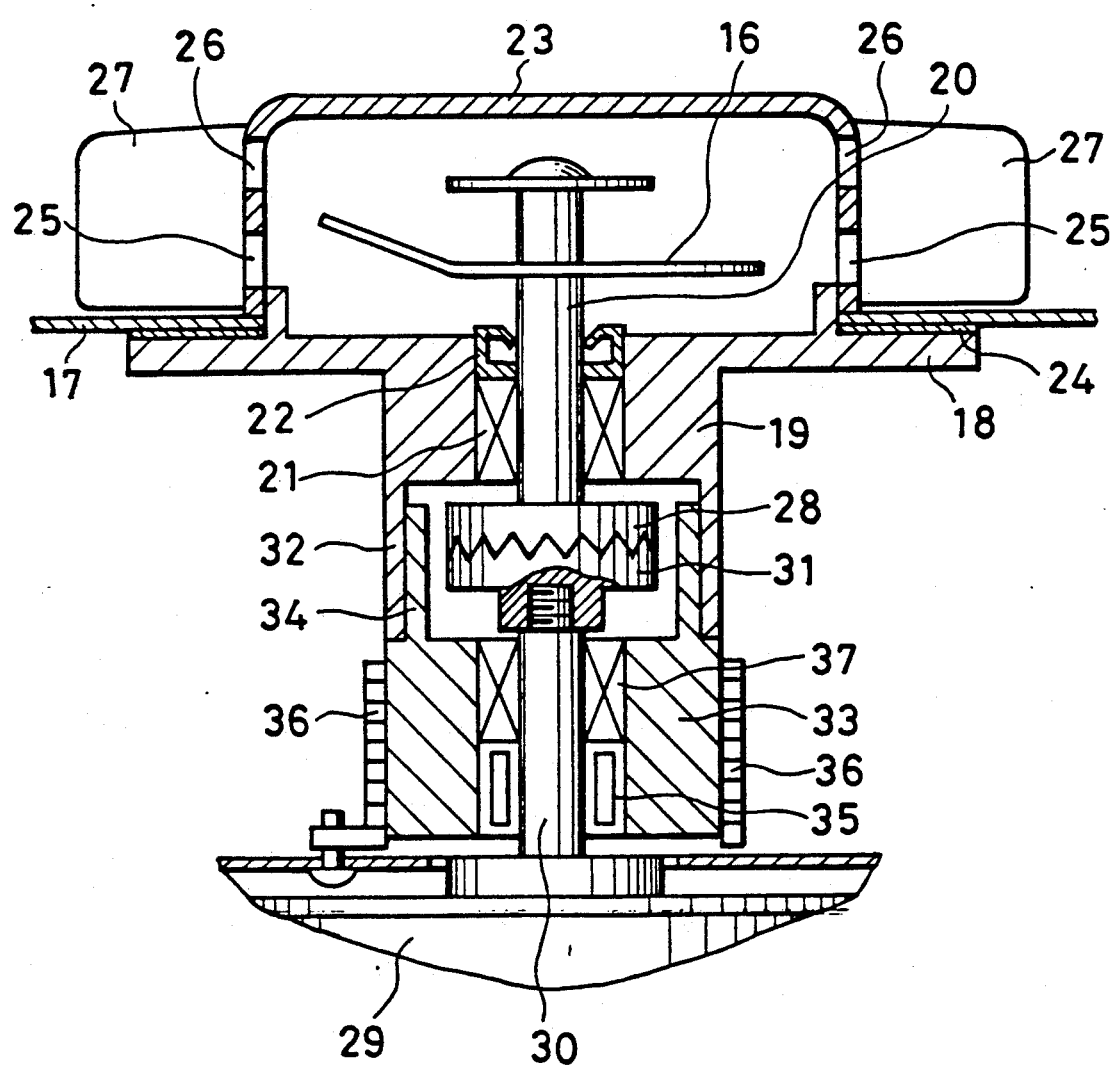
FIG. 3 is an enlarged view of a part of the side section shown in FIG. 1 showing the coupling means and bearings in more detail.

In the apparatus shown in FIGS. 1 and 3, a rotary cutter 16 for smashing soybeans is fixed on a cutter axle 20 which is rotatably supported by a hollow shaft 19 through a bearing 21 and an oilseal 22. The hollow shaft 19 has on its upper end a flange 18 on which a cylindrical pan 17 is mounted at its bottom plate. An inverted cup 23 detachably fastens the cylindrical pan 17 to the flange 18 of the hollow shaft 19 through a packing 24 with screws or the like fastening means.

Figure 4:
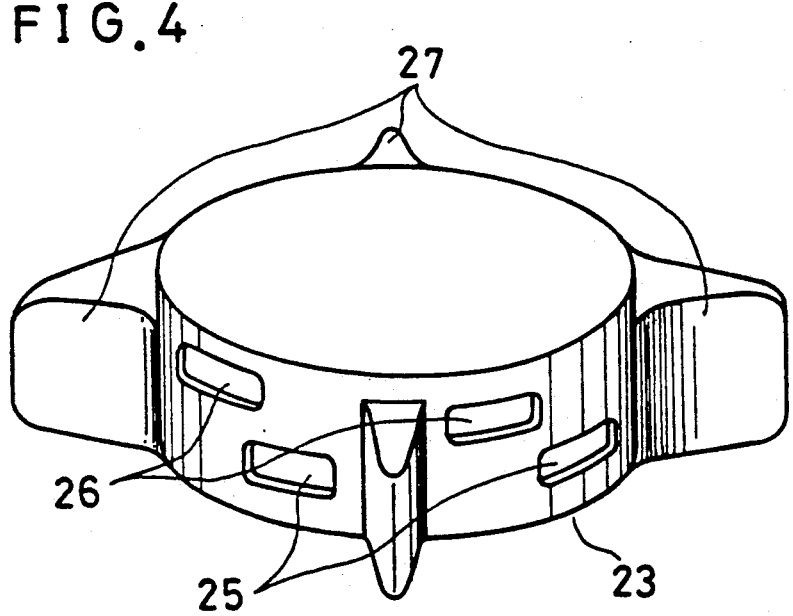
FIG. 4 is a perspective view showing an inverted cup of the embodiment shown in FIG. 1.
Figure 5:
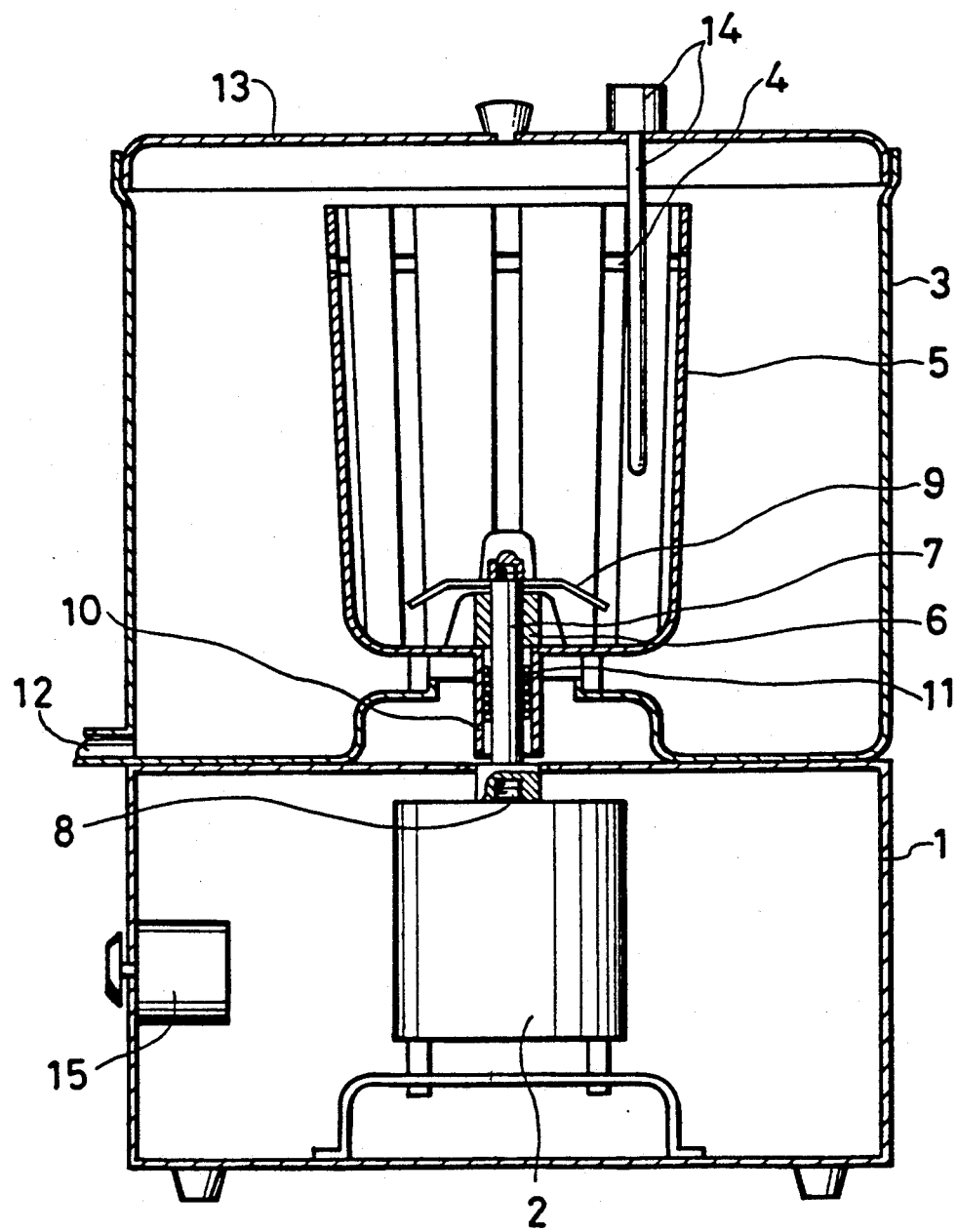
FIG. 5 is a side sectional view showing a known conventional tofu making apparatus.

As better shown in FIG. 4, the inverted cup has on the lower part of its side wall a plurality of openings 25 for introducing soybeans into a space defined by the inverted cup 23 to bring the soybeans to be smashed by the rotary cutter 16, and also has on the upper part of its side wall a plurality of openings 26 for expelling the debris produced as the result of the smashing from the space. Also a plurality of blades 27 for preventing revolving of the water is provided around the inverted cup 23 to facilitate the introduction of the soybeans to the space.

The cutter axle 20 has at its lower end a coupling element 28 which meshes with another coupling element 31 provided on the upper end of a motor axle 30 of a motor 29. Both the elements rotate together during the meshing which can be released by vertical displacement of either one.

At the lower end of hollow shaft 19, there is provided a large coupling element 32 which meshes with another large coupling element 34 mounted on an upper end of a motor hollow shaft 33. Both the elements rotate together during the meshing, which can also be released by vertical displacement of one. The motor hollow shaft 33 is rotatably mounted on the motor axle 30 of the motor 29 with a roller clutch 35 therebetween. The roller clutch 35 is contained in the shaft 33 as shown in the drawing and designed to permit free rotation of the shaft 33 in the clockwise rotation of the motor axle 30 (viewed from upside, the same applies hereinafter) and to bind the shaft 33 to the axle 30 in its anti-clockwise rotation at a high speed e.g. 5000 rpm. A spring clutch 36 is provided around the shaft 33 and designed to restrict the clockwise rotation of the motor hollow shaft 33 which tends to be driven to rotate in that direction while permitting its free rotation in the anti-clockwise rotation. A bearing 37 is placed between the motor hollow shaft 33 and the motor axle 30.

Thus, in the clockwise rotation of the motor 29, only the rotary cutter 16 rotates at the high speed (e.g. 5000 rpm) through the small coupling elements 28 and 31 to smash the soybeans. In this case, the motor hollow shaft 33, the hollow shaft 19 with the flange 18 and the pan 17 are bound not to rotate in this clockwise direction to prevent the pan 17 from being driven together by the action of the spring clutch 36.

Figure 1A:
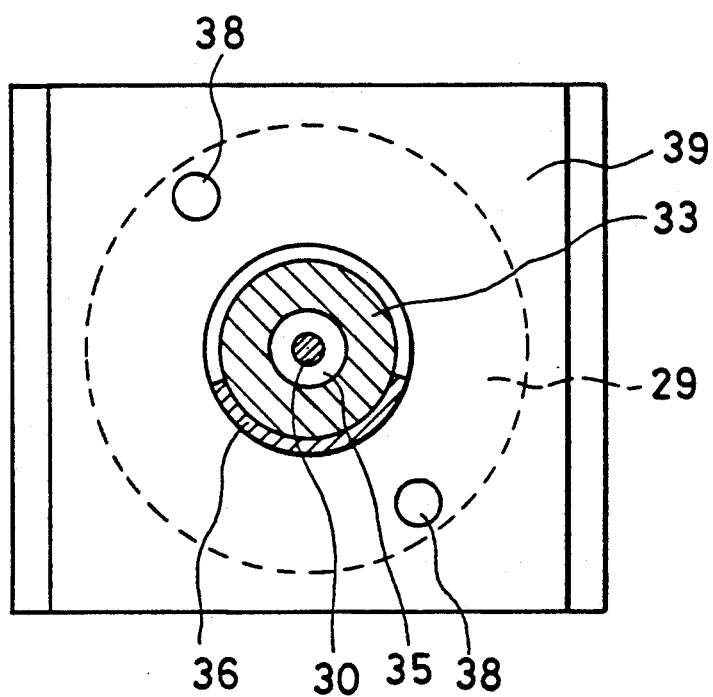
FIG. 1a is a plan view of a motor supporting part of the embodiment shown in FIG. 1.
Figure 2:
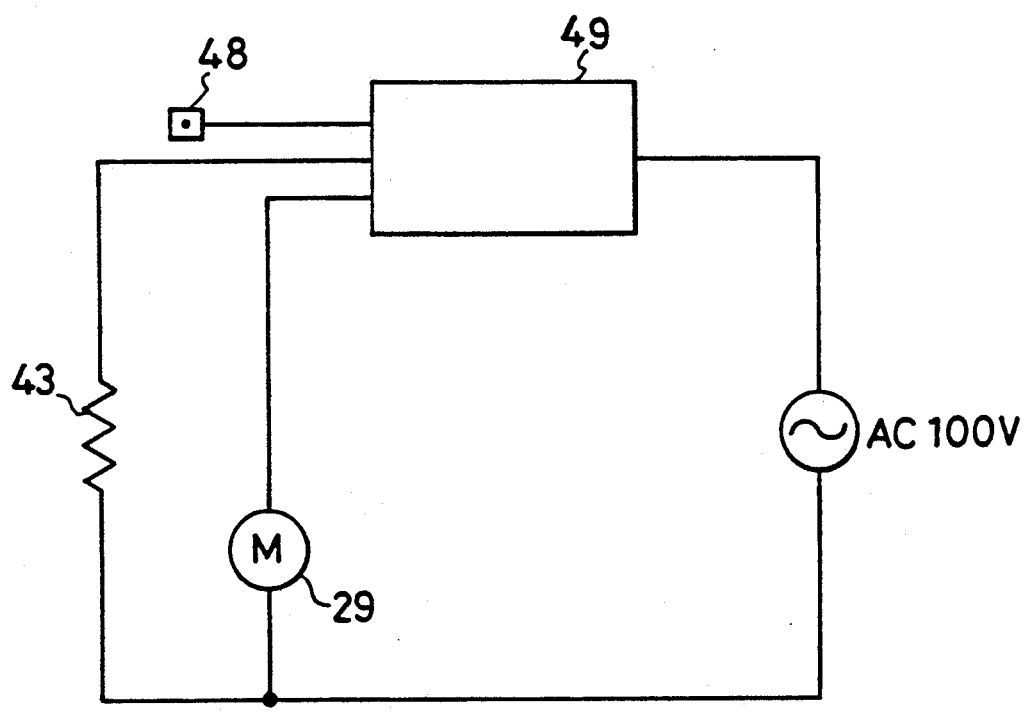
FIG. 2 is an electrical circuit diagram of the embodiment shown in FIG. 1.

In the anti-clockwise rotation of the motor 29, the motor hollow shaft 33 is bound to rotate with the motor axle 30 by the action of the roller clutch 35, to drive the hollow shaft 19 with the flange 18 and the pan 17 together at a lower number of revolution (e.g. 1800 rpm) to centrifugally dewater the gojiru produced in the pan 17. In this situation, the motor hollow shaft 33, the hollow shaft 19 with the flange 18 and the pan 17 can rotate freely, being free from the restriction by the spring clutch 36. A numeral 38 designates two elastic components which support the motor 29 on a motor stand 39 at two points diagonally opposite with respect to the center of the hollow shaft 19 and the cutter axle 20 in a horizontal plane which crosses an approximate center of gravity of the combined body of the cylindrical pan 17 and the motor 29 as shown in FIG. 1a.

Along the periphery of the pan 17, there is provided an annular tonyu trough 40 which is concentric with the pan 17. The annular trough 40 has an outlet 41 for tonyu at a horizontal level slightly lower than the level of the top end of the pan 17 and has a bottom with an inclination towards the outlet 41 at its lowest position.

Under the outlet 41 for tonyu, there is provided a tonyu container 42 which receives the tonyu flown from the trough 40. In the vicinity of the bottom plate of the pan 17, there is provided a heater 43 for heating the pan 17. A cylindrical filter 44 having a multiplicity of small pores is provided inside the pan 17 to detachably fit in the inner side wall of the pan 17. Surface of the cylindrical filter 44 is coated with polytetrafluoroethylene. A reflection plate 45 for reflecting radiation from the heater 43, and a lid 46 with a vapor vent 47 are provided. At a position of the housing which faces the vapor vent 47, there is provided a temperature sensor 48 such as a thermister for detecting the boiling of gojiru in the pan. A controlling unit 49 is for regulating time periods for smashing and heating by the heater, detection of the boiling and centrifugal dewatering by revolution of the pan.

In operation, when the pan 17 is filled with the raw soybeans and water of an amount as much as the weight of approximately 5-6 times of that of the raw soybeans and the controller 49 is switched on, the motor 29 starts to rotate in the clockwise direction, to introduce the raw soybeans into the space defined by the inverted cup 23 through the openings 25. Because the cutter 16 smashes the introduced soybeans to debris and pushes mixture of the debris and water upwards, the mixture is expelled to the pan 17 through the upper openings 26 and the evacuated space is then filled with the material introduced from the lower openings 25, to form a circulation of the admixture between the inside and outside of the inverted cup 23. This circulation continues to repeat for about 5 minutes by the pumping action to make the debris finer.

During the smashing operation, the blades 27 provided around the side wall of the cup 23 serve to block revolving water in the pan to ensure the soybeans and water are sucked in a centering direction, i.e., to the direction towards the rotary cutter 16 to enhance the pumping action further.

At the end of the smashing operation, the heater 43 is supplied with a current to heat the crude gojiru, soybean debris suspended in water, in the pan 17 for about 15-20 minutes to extract soy protein in the crude gojiru to give a cooked gojiru, a mixture of tonyu and beancurd refuses. Since the extracted soy protein is extremely liable to be burnt, stirring of the mixture by intermittent rotation of the rotary cutter 16 is indispensable during the heating. The intermittent rotation continues for about 5 seconds and is repeated several times.

The stirring not only serves to minimize the burning but also heats the crude gojiru evenly to be able to give the soy protein of good quality. When the mixture starts to boil, the quantity of the vapor increases abruptly to bring a sudden blow out of vapor from the vapor vent 47 provided on the lid 46 to invite an abrupt rise in temperature detected by the temperature sensor 48. The boiling of the mixture can be detected by sensing a point of inflection in the temperature curve of the sensor 48 or by sensing an absolute value of the temperature of the sensor 48. When the boiling is detected, supplies of current to the heater 43 and to the motor 29 are stopped.

At the end of the boiling operation, the motor 29 is rotated in the anti-clockwise direction at the lower rotational speed (e.g. 1800 rpm) to drive the pan 17 for a centrifugal dewatering for about 30 seconds to about one minute. The dewatering effects to squeeze the mixture in the pan 17 to rapidly separate tonyu therefrom through a multiplicity of small pores provided in the cylindrical filter 44 coated with polytetrafluoroethylene film. The separated tonyu is introduced into the container for tonyu 42 through the annular trough 40 and outlet 41.

During the dewatering operation, the apparatus does not generate a vibration of large amplitude even when an unbalance occurs in the cylindrical pan 17, because the motor 29 serves as a counterbalance to supress the cylindrical pan from vibrating at small amplitudes and at high speed, realizing a normal rotation.

After the tonyu manufacturing, the apparatus can be cleaned easily, since the lid 46, pan 17, annular trough 40, tonyu container 42 and the like, can be diassembled from each other, and further removing the cylindrical filter 44, the inverted cup 23 and the hollow shaft 19 from the pan. The okara (bean cakes) attached inside the cylindrical filter 44 can be easily scraped therefrom owing to the coating with the polytetrafluoroethylene, and be served as a food as well.

Figure 6:
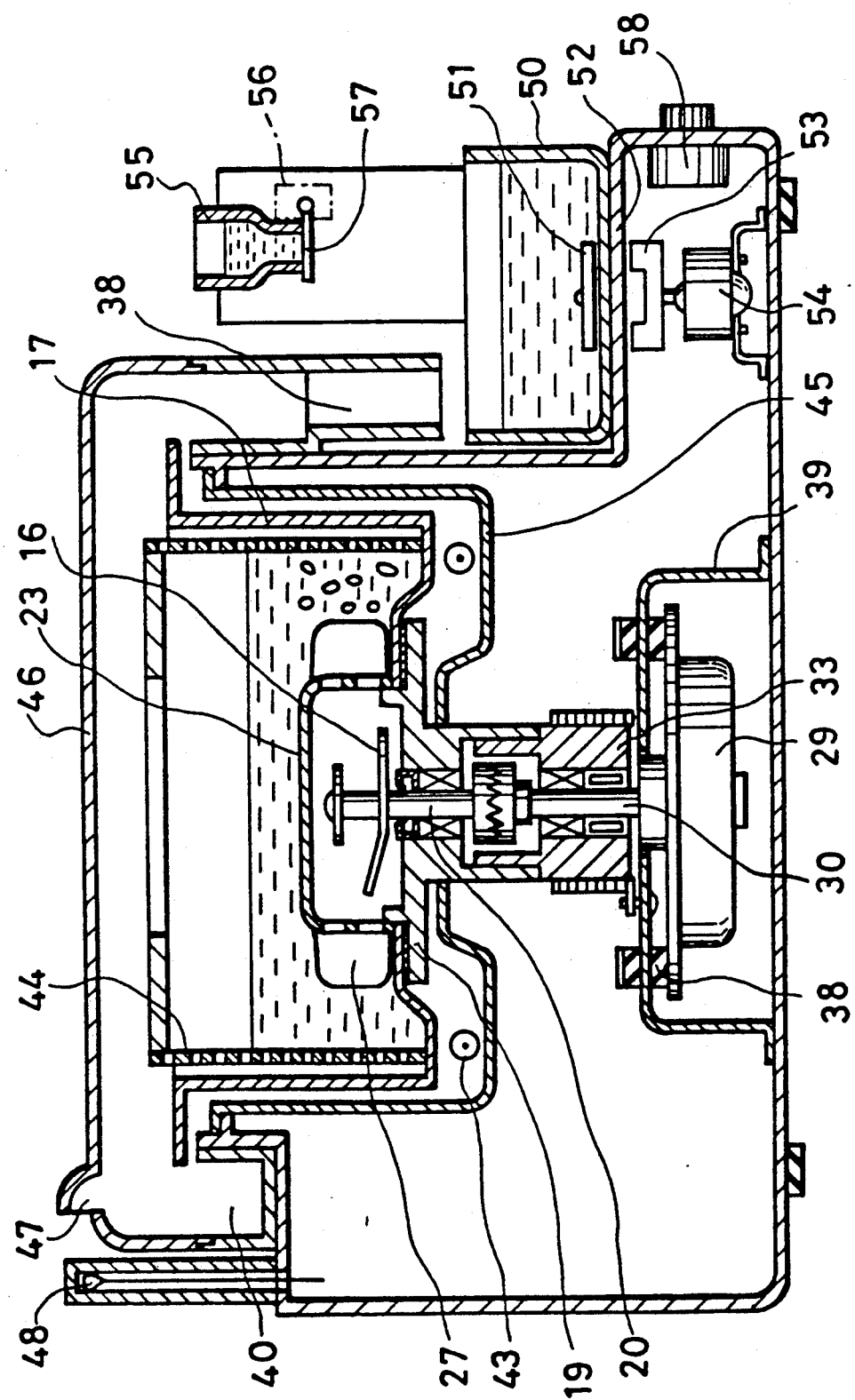
FIG. 6 is a side sectional view showing an essential part of the apparatus which has an additional feature of producing tofu.
Figure 7:
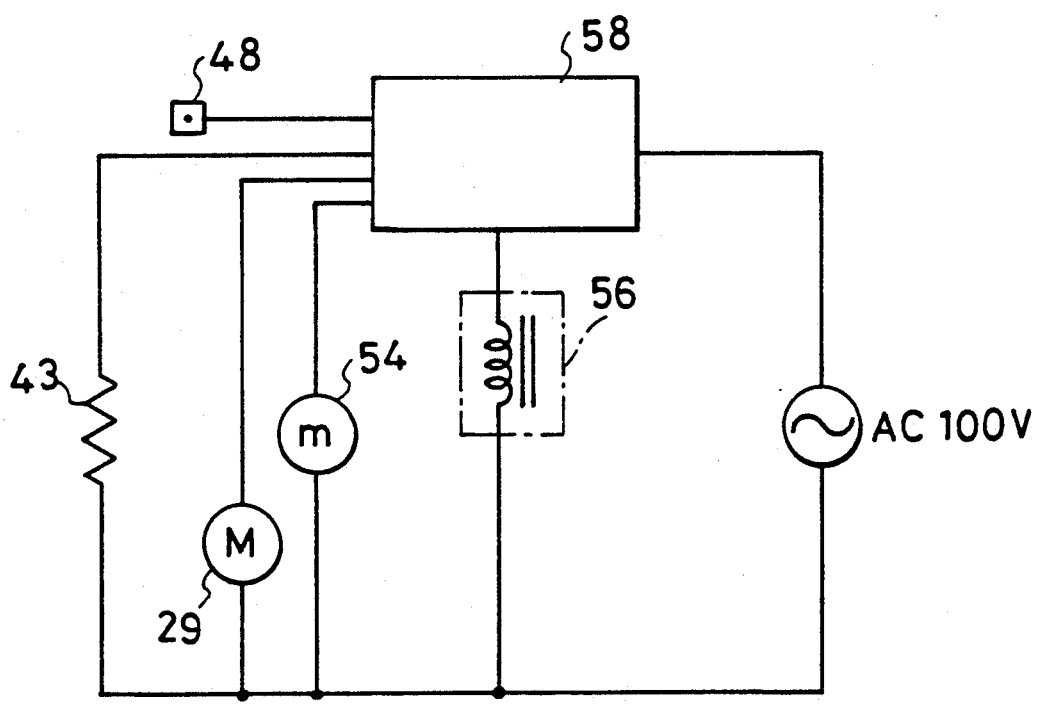
FIG. 7 is an electrical circuit diagram of the embodiment shown in FIG. 6.
Figure 8:
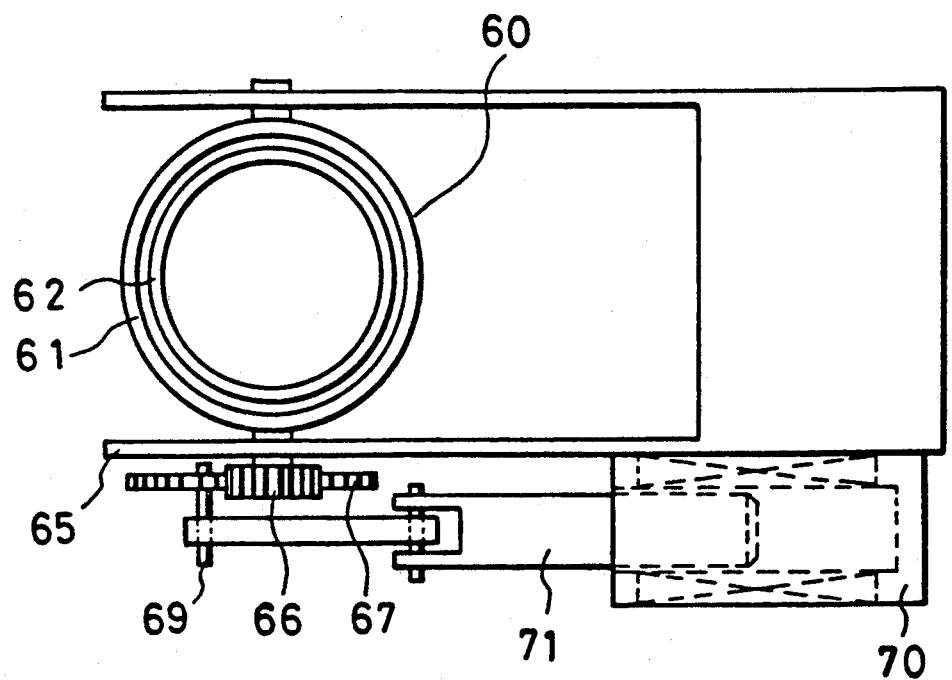
FIG. 8 is a plan view showing an example of the coagulating agent supplying unit.
Figure 9:
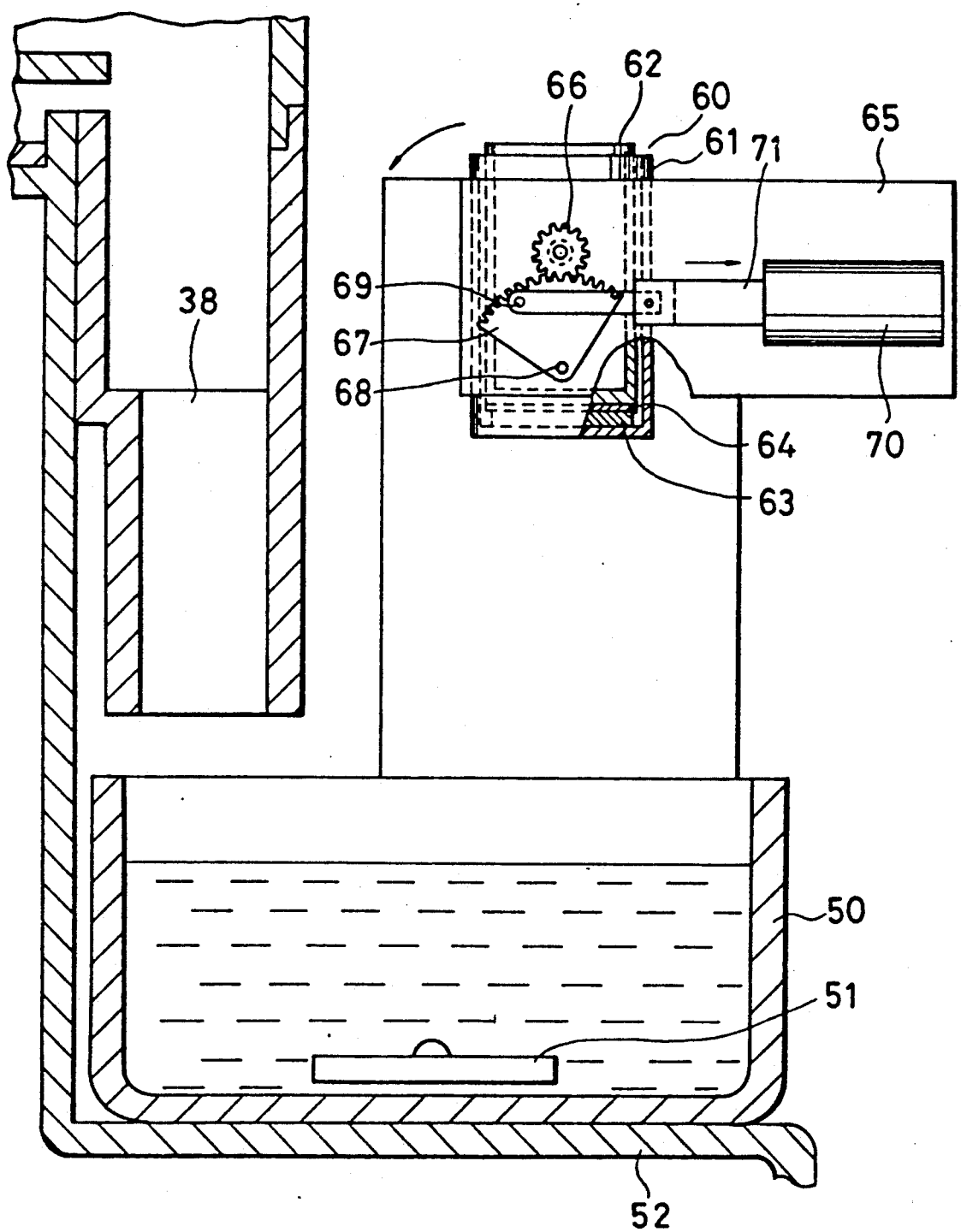
FIG. 9 is a side view partly cut out for illustrating the coagulating agent supplying unit shown in FIG. 8.
Figure 10:
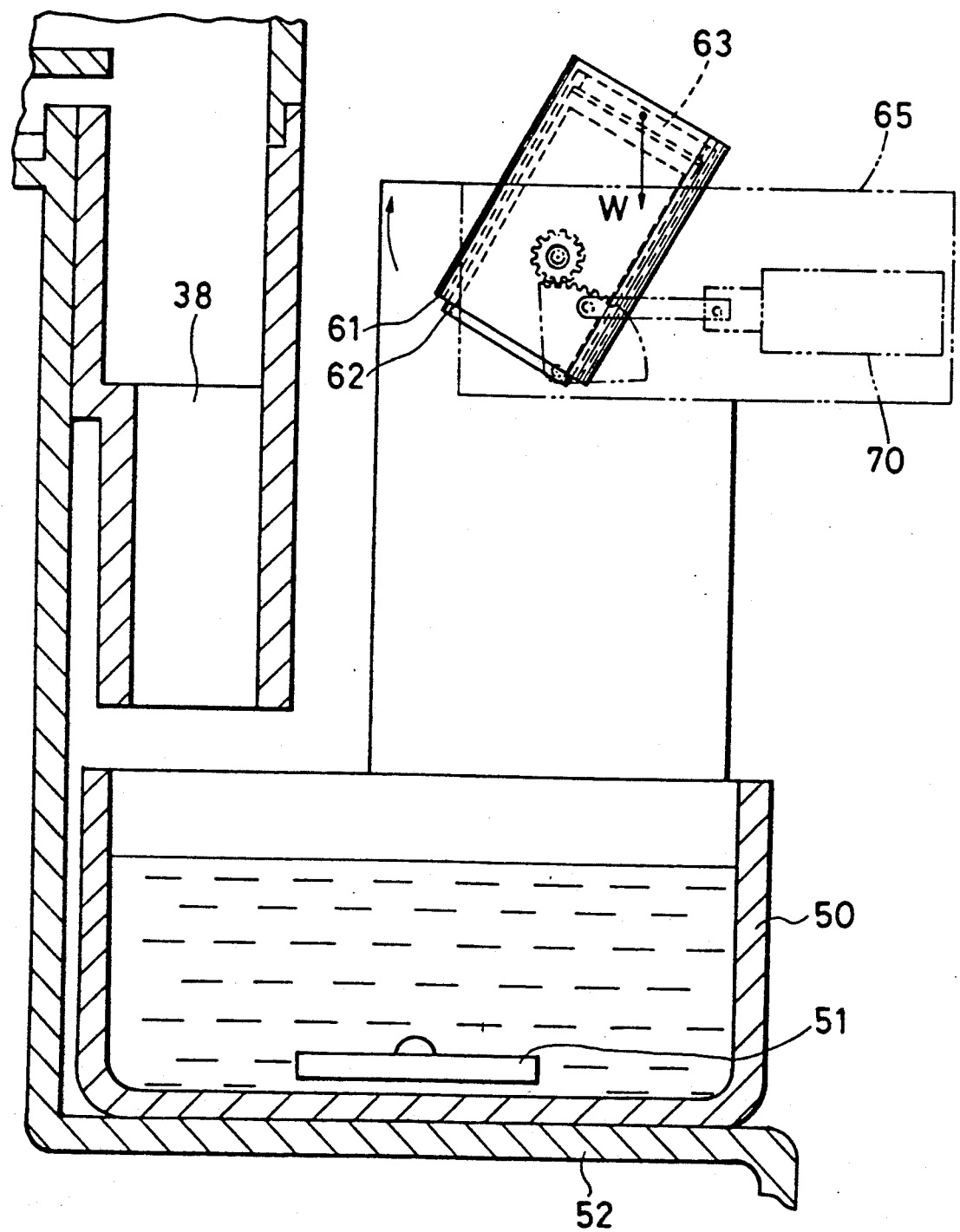
FIG. 10 is a side view partly cut out for illustrating the function of the unit shown in FIGS. 8 and 9.

In the following paragraphs, an apparatus for manufacturing tofu will be described in detail with reference to an embodiment illustrated in FIGS. 6 and 7. Since tonyu manufactured by the apparatus shown in FIG. 1 or any other apparatus can be used for the tofu manufacturing, the arrangement for tonyu manufacturing is ommited from the illustration. For convenience of illustration, the apparatus of FIG. 1 is used until the stage of manufacturing the tonyu and the reference numerals used in FIG. 1 are also used to designate the corresponding parts in FIGS. 6 and 7, wherein a molding tray 50 for tofu is placed to directly face the tonyu outlet 38. The tray 50 holds therein a magnetic stirring blade 51 which rotates by a rotating magnetic field. Inside a pedestal 52, there are provided a rotating magnet 53 and a small motor 54 for driving the magnet 53 as shown in the drawing. A unit 55 for supplying coagulating agent is provided above the molding tray 50. The unit 55 is designed to throw the coagulating agent into the molding tray 50 through a valve 57 which is actuated by an electromagnet 56.

A controlling unit 58 for optimum control of the conditions in the consecutive steps is provided to control, the time periods for smashing soybeans, heating by the heater and detection of boiling, the time periods for centrifugal dewatering by the pan 17 and stirring tonyu in the molding tray 50, and the timing for supplying coagulating agent.

In operation of manufacturing Kinugoshi tofu, tonyu is first manufactured with the raw soybeans and water in the amount of about 5-6 times as much as the weight of the soybean by supplying these into the pan 17. The tonyu poured into the molding tray 50 is then stirred by the stirring blade 51 which is rotatably driven by the small motor 54. At the same time, the valve 57 of the coagulating agent supplying unit 55 opens and throws the coagulating agent into tonyu and, a few seconds later, the stirring blade 51 stops to rotate.

The tonyu in the molding tray 50 of about 80° C. starts to coagulate with the supply of the coagulating agent and to give tofu by being stood cool for about 20 minutes after the stop of stirring. The produced tofu is taken out into water and stored therein until it is served as a food.

In the manufacture of Momen tofu, the tonyu is prepared with water of the amount of about 9-10 times as much as the weight of raw soybeans. The tonyu is then added with the coagulating agent by manual operation while being gently stirred by manual operation with, for instance, a spoon to produce so-called Oboro tofu (scrambled beancurd). The resultant oboro tofu is thereafter poured into another container with small pores whose inside surface is covered with a cotton filter. In short, the momen tofu can be manufactured by performing the steps after the supply of coagulating agent mainly in manual operation.

In the following paragraphs, modified embodiments of the coagulating agent supplying unit will be described by referring to FIGS. 8-11. It will be apparent that the coagulating agent supplying unit of FIG. 6 can be substituted by these modified embodiments. In the drawings, a double container 60 is provided with its top end open comprising an outer container 61 and an inner container 62. A magnet 63 (FIG. 9) is fixed on the bottom of the outer container which also serves as a balance weight and a magnetic piece 64 (for instance, a plated steel piece) is fixed beneath the bottom of the inner container 62. The inner container 62 is detachably mounted on the outer container 61 by the magnetism between the magnet 63 and the magnetic piece 64. On the side wall of the outer container 61, there is provided a pinion 66 whose axle pierces through the supporting plate 65 mounted on the base of the apparatus. The pinion 66 meshes with a sector gear 67 whose axle 68 is also rotatably mounted on the supporting plate 65. An electromagnetic solenoid 70 with a plunger 71, which is mounted on the supporting plate 65, is connected to the sector gear 67 through a rod 69.

In operation, the solenoid 70 is energized to pull the plunger 71 inwards automatically by a time switch (not shown in the drawing) at the timing of the supply. The inward displacement (attraction) of the plunger 71 effects to rotate the sector gear 67 and the pinion 66. When the double container 60 inclines by the rotation of the pinion 66 to a position indicated by FIG. 10, the open end of the double container 60 faces obliquely downwards to pour the coagulating agent stored in the inner container 62 into the tray 50.

After the supply, the energization of the solenoid 70 and pulling action of the plunger 71 on the sector gear 66 are removed. Then a gravity indicated by an arrow W in FIG. 10 of the magnet 63 acts on the double container 60 to restore it to the original position shown in FIG. 9.

Figure 11:
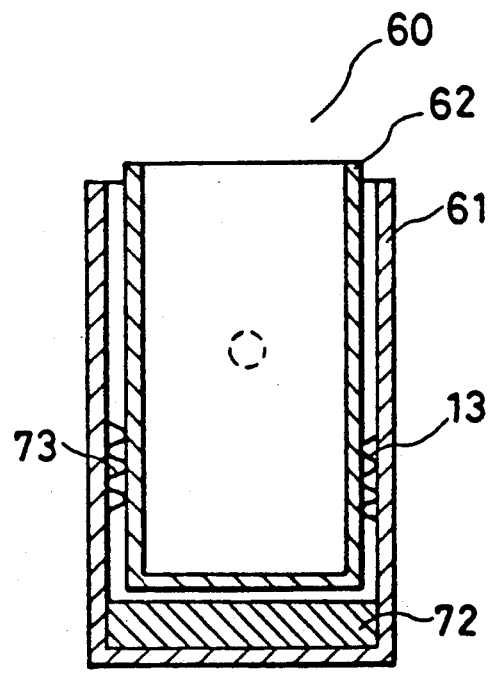
FIG. 11 is a side sectional view showing another embodiment of coagulating agent supplying unit.

In another modified embodiment shown in FIG. 11, the inner container 62 is detachably fit in the outer container 61 through an elastic body or frictional material 73. A simple balance weight 72 is fixed on the bottom of the outer container 61 for restoring the container to its original angular position.

Furthermore, the electromagnetic solenoid 70 may be substituted by any other actuating means as far as it can rotate the sector gear 67 by pulling it through the rod 69. These means can be exemplified as a shape-memory alloy and an electric motor.

Although the present invention has been fully described in connection with preferred embodiments thereof with reference to the accompanying drawings, it is to be noted that various changes and modifications are apparent to those skilled in the art to which the present invention belongs. Such changes and modifications are to be understood as included within the scope of the present invention as defined by the appended claims unless they depart therefrom.

What is claimed is:

1. An apparatus for manufacturing tonyu which comprises;
   a) a cylindrical pan with substantially smooth inner wall,
   b) a hollow shaft having a flange for supporting said pan,
   c) a rotary cutter whose axle is disposed concentric with and rotatably supported by said hollow shaft and has a cutting tip for smashing raw soybeans,
   d) an inverted cup mounted on the bottom of said pan to cover said cutting tip part of said rotary cutter and having a side wall with a plurality of inlet and outlet openings and a plurality of blades outside it,
   e) a heater placed near said pan for heating said pan,
   f) a driving motor for driving two coupling means, one being detachably engageable with said hollow shaft and the other with the cutter axle for rotating said hollow shaft and said cutter axle, respectively and independently,
   g) a cylindrical filter detachably fit on the inner wall of said pan and having a multiplicity of small pores, and
   h) a container placed along the periphery of said pan for receiving centrifugally-squeezed tonyu.

2. The apparatus for manufacturing tonyu as claimed in claim 1, wherein said cylindrical pan is detachably fixed on the flange of said hollow shaft with said inverted cup through a packing.

3. The apparatus for manufacturing tonyu as claimed in claim 1, wherein the surface of said cylindrical filter including surfaces of a multiplicity of small pores is coated with polytetrafluoroethylene layer.

4. The apparatus for manufacturing tonyu as claimed in claim 1, wherein said cutter axle and hollow shaft are adapted to mesh with a motor axle and a motor hollow shaft mounted on the motor axle with said two coupling means, respectively, and detachable with vertical displacement of one, wherein said motor hollow shaft is mounted on the motor axle through a bearing and a one way roller clutch which exhibits a resistance to one rotational direction, and has at its lower end a spring clutch which exhibits a resistance on the shaft in a rotational direction reverse to that of the one way roller clutch.

5. The apparatus for manufacturing tonyu as claimed in claim 1, which further comprises a lid covering said cylindrical pan and having a vapor vent, and a temperature sensor provided adjacent to the vapor vent.

6. The apparatus for manufacturing tonyu as claimed in claim 1, which further comprises an annular cylindrical trough for tonyu being concentric with and encircling said cylindrical pan and having an outlet at a level slightly lower than that of the upper end of said pan and said heater is placed adjacent to the periphery of the bottom plate of said pan.

7. The apparatus for manufacturing tonyu as claimed in claim 1, which further comprises a controlling unit adjusted to rotate said rotary cutter intermittently while said heater is energized.

8. The apparatus for manufacturing tonyu as claimed in claim 1, wherein said plurality of outlet openings are provided above said inlet openings on the side wall of said inverted cup.

9. The apparatus for manufacturing tonyu as claimed in claim 1, wherein said cylindrical pan and motor are mounted on the housing through elastic components at two points diametrically opposite with respect to the center of said cutter axle and hollow shaft in a plane of a level at an approximate center of gravity of the combined body of said pan and motor.

10. An apparatus for manufacturing tofu comprising:
a) a cylindrical pan,
b) a rotary cutter for smashing raw soybeans in said pan,
c) a heater for heating said pan,
d) a cylindrical filter having a multiplicity of small pores fit in an inner side wall of said cylindrical pan,
e) a molding tray for receiving tonyu centrifugally-squeezed by rotation of said pan,
f) a rotary stirrer placed on the bottom of said molding tray,
g) a coagulating agent supplying unit provided above said molding tray,
h) a controlling unit for controlling time periods for smashing soybeans and for heating by said heater, the detection of the boiling, the time periods for centrifugal squeezing by said pan and for stirring tonyu in said molding tray and the timing for throwing coagulating agent.

11. The apparatus for manufacturing tofu as claimed in claim 10, wherein said coagulating agent supplying unit comprises a top end open double container of an inner container detachable to an outer container which is rotatably supported about a horizontal axis and takes, with an electromagnetic means, a position at which said top end faces above and and another position at which said top end obliquely faces below.

12. The apparatus for manufacturing tofu as claimed in claim 10, wherein said inner container is detachably mounted on the outer container by the magnetism between a magnet provided on the bottom of the outer container and the magnetically attractable piece provided on the bottom of the inner container.

13. The apparatus for manufacturing tofu as claimed in claim 10, wherein said inner container is detachably fit in the outer container through an elastic body or frictional material, and a balance weight is fixed on the bottom of the outer container for restoring the container to its original angular position.

* * * * *